United States Patent [19]

Mollenauer et al.

[11] Patent Number: 5,059,230
[45] Date of Patent: Oct. 22, 1991

[54] FABRICATION OF DOPED FILAMENT OPTICAL FIBERS

[75] Inventors: Linn F. Mollenauer, Colts Neck; Jay R. Simpson, Fanwood; Kenneth L. Walker, New Providence, all of N.J.

[73] Assignee: AT&T Bell Laboratories, Murray Hill, N.J.

[21] Appl. No.: 468,433

[22] Filed: Jan. 22, 1990

[51] Int. Cl.$^5$ ............................................. C03C 25/02
[52] U.S. Cl. ...................................... 65/3.11; 65/3.12; 65/3.2; 65/18.2; 65/900
[58] Field of Search ..................... 65/3.12, 18.2, 3.14, 65/3.11, 3.2

[56] References Cited

U.S. PATENT DOCUMENTS

| | | | |
|---|---|---|---|
| 3,966,446 | 6/1976 | Miller | 65/3.12 |
| 4,123,483 | 10/1978 | Nakahara | 65/18.2 |
| 4,217,027 | 8/1980 | MacChesney et al. | 65/3.12 |
| 4,230,396 | 10/1980 | Olshansky | 65/3.11 |
| 4,616,901 | 10/1986 | MacChesney et al. | 65/3.16 |
| 4,787,927 | 11/1988 | Mears et al. | 65/18.2 |
| 4,820,322 | 4/1989 | Baumgart et al. | 65/3.11 |
| 4,822,399 | 4/1989 | Kanamori | 65/3.12 |
| 4,848,998 | 7/1989 | Snitzer | 65/3.11 |

FOREIGN PATENT DOCUMENTS 57-92536  6/1982  Japan ..................... 65/3.11

OTHER PUBLICATIONS

S. B. Poole et al., Elec. Lett., vol. 21, No. 17, Aug. 15, 1985, "Fabrication of Low-Loss Optical Fibres . . . ", pp. 737-738.
S. B. Poole et al., J. of Lightwave Tech., vol. LT-4, No. 7, Jul. 1986, "Fabrication and Characterization of Low-Loss Optical . . . ", pp. 870-876.
J. E. Townsend et al., Elec. Lett., vol. 23, No. 7, Mar. 26, 1987, "Solution-Doping Technique for Fabrication . . . ", pp. 329-331.
E. Snitzer et al., Optics Lett., vol. 14, No. 14, Jul. 15, 1989, "SiO$_2$-Clad Fibers with Selectively Volatilized . . . ", pp. 757-759.

Primary Examiner—Kenneth M. Schor
Assistant Examiner—John J. Bruckner
Attorney, Agent, or Firm—Gregory C. Ranieri

[57] ABSTRACT

Reproducible doped optical fiber preforms having a predetermined dopant concentration level are fabricated by inserting a doped filament into a completed preform prior to consolidation and final collapse so that the filament and dopant materials are centrally located in the core region upon formation of the preform. Doped fiber is drawn from the doped preform using standard fiber drawing techniques.

7 Claims, 4 Drawing Sheets

FABRICATION OF DOPED FILAMENT OPTICAL FIBERS

TECHNICAL FIELD

This invention relates to fabrication of optical fiber preforms and the resulting optical fibers and, more particularly, to fabrication techniques wherein the preforms and resulting fibers include dopant material such as rare-earth dopants.

BACKGROUND OF THE INVENTION

Optical amplifiers in intermediate optical repeaters, low noise pre-amplifiers in receivers, and high power post-amplifiers in transmitters are important elements in most lightwave communication and transmission systems of interest. A potentially valuable embodiment of such amplifiers is the fiber amplifier which permits amplification by incorporation of dopant material such as rare earth ions in a host fiber.

At the present time, erbium is the dopant material of choice for silica-based fibers because both the pump and signal wavelengths are supported in the host fiber with relatively low intrinsic loss. Delivery of rare earth species to the reaction and deposition zone during fiber preform fabrication have been devised for standard techniques such as modified chemical vapor deposition (MCVD), vapor axial deposition (VAD), and outside vapor deposition (OVD). These delivery methods require a high degree of accuracy and temperature control of the vapors to insure commencement of the necessary chemical reactions for incorporation of the rare earth ions. Solution doping techniques have also been proposed for incorporating low volatility rare earth ions delivered as halides into high purity fiber preforms formed by each of the techniques listed above. This doping technique also requires a certain amount of control owing to the low vapor pressure of the rare earth dopants.

In most optical amplification applications, high dopant levels on the order of several parts per million to several hundreds or thousands of parts per million are required. For distributed amplification applications, dilute dopant levels on the order of several parts per billion are desired. While the doping techniques mentioned above are capable of producing relatively uniform, high dopant level concentrations in the preform, there is no evidence to suggest that these techniques can produce the same degree of uniformity for the dilute concentrations needed in distributed amplifying fibers. For distributed amplifying fibers, it is important to provide a relatively uniform gain along the fiber length from one end to the other.

In addition to the concentration level and its uniformity of distribution in the preform, it is equally important to be able to center the dopants in the core region in the preform and fiber, to control outdiffusion of dopants from the core region of the preform and fiber, to achieve a desired concentration level regardless of magnitude, and to achieve the desired concentration level reproducibly from one preform to the next. Many of the doping techniques maintain control of the dopants to prevent outdiffusion from the core region. However, most techniques do not provide enough accuracy to center the dopant materials in the core region. Also, these doping techniques are not sufficiently controlled or controllable to achieve an a priori desired concentration level. As a result, these techniques are not well suited for a production environment which requires reproducibility from preform to preform and from fiber to fiber.

SUMMARY OF THE INVENTION

Reproducible doped optical fiber preforms having a predetermined dopant concentration level are fabricated by inserting a doped filament into a substantially completed preform so that the filament will be centrally located in the core region upon collapse or consolidation of the preform. Since the dopant concentration level of the doped filament is known prior to its insertion in the preform, the dopant concentration level is controllable and calibrated to achieve the desired concentration in the resulting fiber. Dopant materials such as rare earth elements and other elements are suitable for use by this technique.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Figure 1:
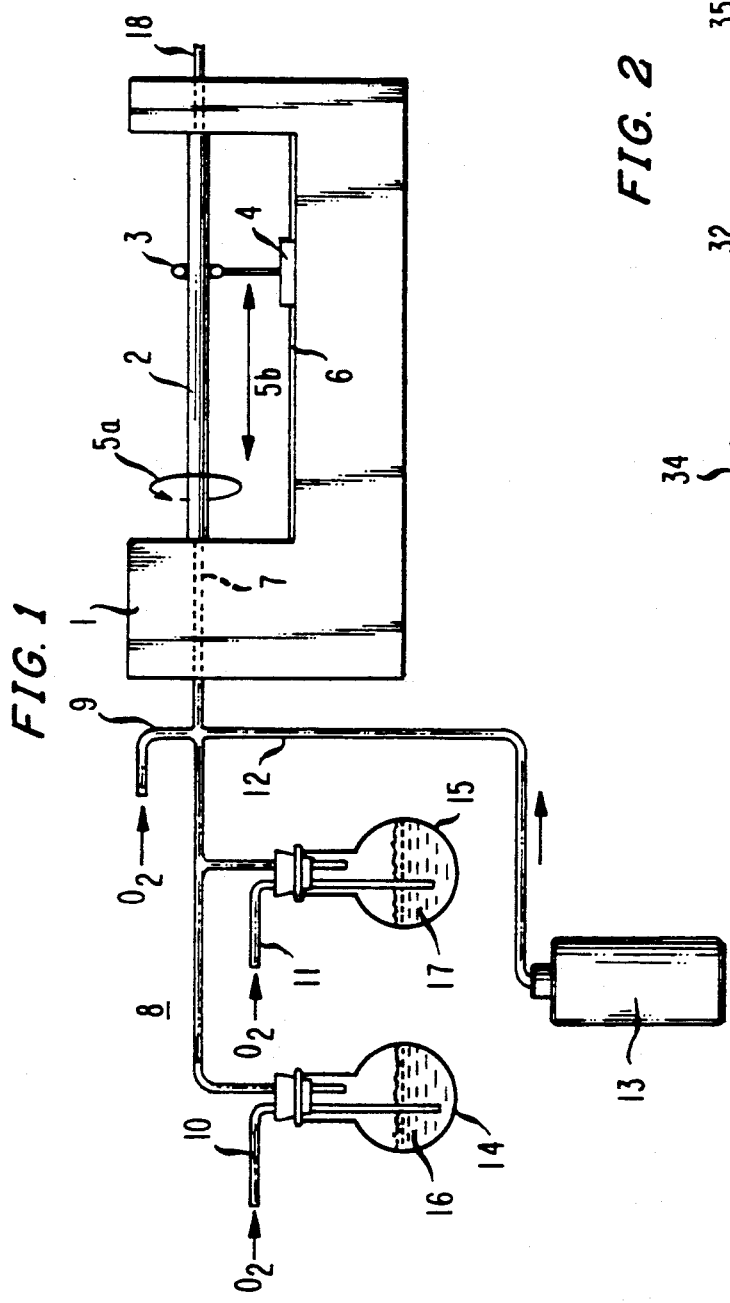
FIG. 1 is a front elevational view of apparatus suitable for practice of the inventive method using modified chemical vapor deposition for preform fabrication.

Optical fiber amplifiers are generally embodied as a standard optical fiber having core and cladding regions and dopant material substantially contained in the core region for providing gain via stimulated emission. Popular dopant materials for achieving stimulated emission in fiber amplifiers are found in the rare earth or lanthanide ions such as $Nd^{3+}$, $Ho^{3+}$, $Eu^{3+}$, $Er^{3+}$, $Yb^{3+}$, $Tb^{3+}$, and $Dy^{3+}$. For most standard communications applications, the elements such as $Nd^{3+}$ and $Er^{3+}$ are commonly used because of the compatibility of the pump wavelength for these materials with the loss minima in the silica-based fibers. In the description below, the embodiments employ $Er^{3+}$ ions for achieving signal amplification in silica-based fibers. The description of the particular fiber and the particular dopant material is intended to be for illustrative purposes and is not intended for purposes of limitation.

Various fiber structures can be employed for fiber amplifiers. That is, structures known to those skilled in the art may be employed such as depressed cladding fibers, dispersion shifted fibers, quadruple clad fibers, polarization maintaining fibers, step-index core fibers and the like. All these fiber structures are capable of being manufactured by standard techniques such as vapor axial deposition (VAD), outside vapor deposition (OVD), and modified chemical vapor deposition (MCVD). It is contemplated that any and all the fiber structures may be employed in accordance with the principles of the invention for preform and fiber fabrication.

In accordance with the principles of the present invention, the process of fabricating a doped optical fiber preform and, ultimately, a doped optical fiber includes depositing cladding and core regions for the preform according to a standard deposition technique such as MCVD, VAD, OVD or the like, inserting a filament having a calibrated amount of dopant ions such as $Er^{3+}$ or the like into a region so that it is surrounded by the core, consolidating or collapsing the cladding and core around the doped filament to form the doped preform structure with the core section engaging the filament, and drawing the doped optical fiber from the doped preform using standard fiber drawing techniques. The filament is formed by standard fiber fabrication and doping techniques. In an exemplary embodiment, MCVD fabrication of a standard silica-based preform including solution doping with rare earth ions and subsequent drying and collapse was followed by a fiber drawing step to realize a doped filament having a precalibrated dopant concentration. It will be apparent to those of ordinary skill in the art that the filament is a "seed fiber". This term is used to connote the operation of the filament seeding the preform structure with dopant material. However, to avoid confusion, the term filament is being used to distinguish it from the doped optical fiber drawn from the doped optical fiber preform which incorporated the filament.

The following description covers modified chemical vapor deposition as an exemplary standard deposition method and solution doping as an exemplary method for introducing dopant materials into a preform. Both of these techniques are employed to form an exemplary filament. That is, the exemplary doped preform is fabricated using MCVD processing together with vapor phase doping followed by standard fiber drawing methods to form the doped filament. After the doped filament has been drawn, its dopant concentration is measured and the filament is prepared for insertion into the cylindrical opening formed in the core region of the deposited materials comprising the preform.

MCVD PROCESSING

MCVD is the simplest and perhaps most flexible of the lightguide processes. It starts with a tube, typically commercial silica, which provides part of the cladding in the lightguide structure, and also acts as a containment vessel for the deposition process. The tube is characterized and selected for dimensions, siding, cross-sectional area and uniformity, and cleaned prior to use. The deposition station consists of a glass working lathe, a chemical delivery system, and associated computer control console. The entrance end of the tube is mounted in one of two synchronously rotating chucks of the lathe and coupled to the chemical delivery system via a rotating joint. The other end of the tube is flared and fused to a larger tube mounted in the second chuck; this large tube serves to collect unincorporated material resulting from the deposition process and is coupled to a chemical scrubbing system. After setup of the tube, it is rotated and fire polished by means of a traversing heat source. Next, the deposition phase of the process begins.

The basic deposition process predominantly involves the high temperature homogeneous gas phase oxidation of volatile vapor delivered compounds that are deposited as submicron particles via thermophoresis and fused to a clear glass film. The deposition process uses controlled amounts of chemical reagents entrained in a gas stream by passing carrier gases such as $O_2$ or He through liquid dopant sources such as $SiCl_4$, $GeCl_4$, or $POCl_3$ or direct proportionation of gaseous dopants such as $SiF_4$, $BCl_3$, and $CCl_2$. As in all forms of vapor phase processing, this method of delivery acts as a purification step relative to transition metal impurities which might be contained in raw materials, and are characterized by much lower vapor pressures. The chemical gas mixture is injected into the rotating tube where a hot zone is traversed along the length of the tube by an external moving heat source, typically an oxyhydrogen burner.

The temperature of the hot zone is controlled via optical pyrometry monitoring and feedback to a flame temperature controller. Layer by layer of material is deposited and sufficient heat from the moving heat source results in the sintering of the deposit as the hot zone passes over it.

In MCVD, first high purity cladding is deposited, then core. This cladding serves a number of functions: it acts as a barrier to indiffusion of impurities, particularly OH, into the active region of the lightguide; it insures low cladding losses for any power which propagates in the cladding; lastly, it minimizes any scattering losses that might occur due to tubing defects or interfacial irregularities at the tubing inner surface. For single-mode fibers, the deposited cladding can also serve the additional function of allowing more complex, dispersion optimized designs to be made, by tailoring the cladding index profile. Core deposition ensues next, involving 30–70 layers for multimode structures, versus one to several layers for single-mode structures. The deposited cladding can be a variety of index matched or depressed compositions in the $F—SiO_2—GeO_2—P_2O_5$ system, where small amounts of $P_2O_5$ are sometimes used predominantly to decrease the deposition temperature. Core compositions are typically $GeO_2—SiO_2$, where small amounts of $P_2O_5$ are used for graded index multimode fibers. The dimensions and refractive index profile of the eventual fiber structure is built up by depositing successive layers of controlled composition to the desired thickness, then collapsing the composite tube plus deposit to a solid preform rod. The total number of deposited layers is chosen on the basis of starting tube dimensions, deposition rate, profile complexity and fiber design.

With respect to MCVD processing, FIG. 1 depicts a lathe 1 holding substrate tube 2 within which a hot zone 3 is produced by heating means 4. Tube 2 may be rotated, for example, in the direction shown by arrow 5a by means not shown and hot zone 3 is caused to traverse tube 2 by movement of heating means 4 as schematimixture of $Cl_2$ and $O_2$. The solution doping method is described in more detail in *Electronics Letters*, Vol. 23, No. 7, pages 329-331 (1987). This article is expressly incorporated herein by reference.

DOPED PREFORM FABRICATION

Figure 3:
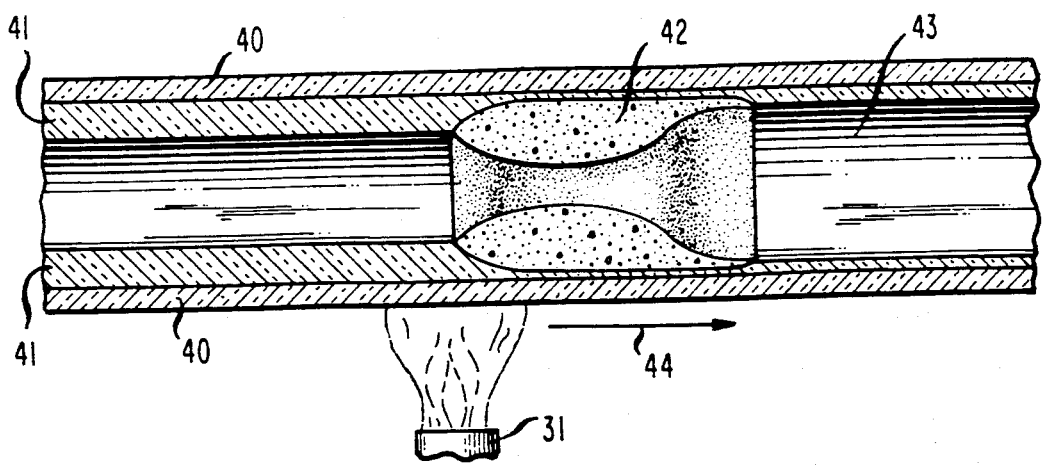
FIG. 3 is a simplified cross-sectional view of the tubular material after modified chemical vapor deposition and partial collapse for preform fabrication.
Figure 5:
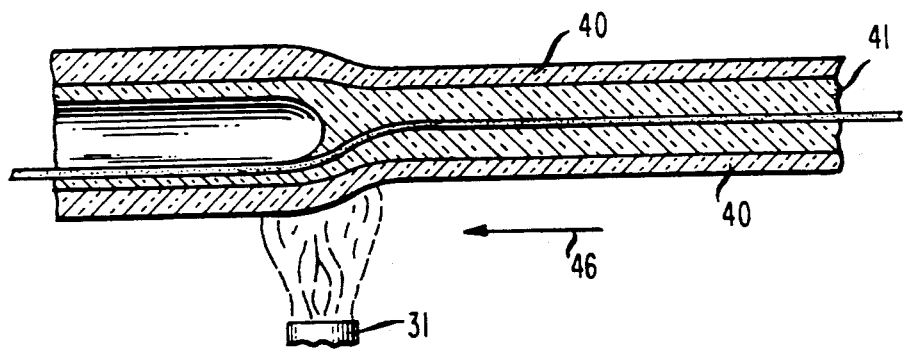
FIG. 5 is a simplified cross-sectional view of the tubular material shown in FIG. 4 during the collapsing process in preform fabrication.

Fabrication of the doped optical fiber preform is illustrated in the sequence of Figures beginning at FIG. 3 and continuing through FIG. 5.

Figure 2:
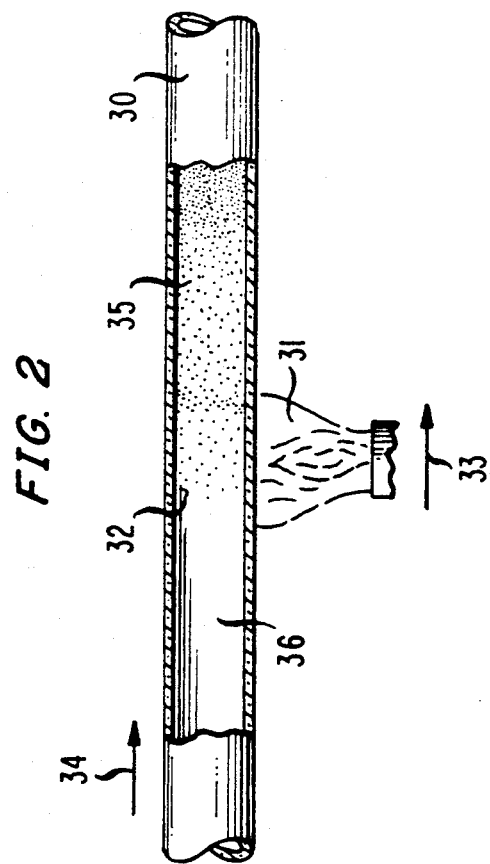
FIG. 2 is a front elevational view of a section of tubular material depicting observed conditions during processing using modified chemical vapor deposition for preform fabrication.

In FIG. 3 substrate tube 40 is shown in cross-section undergoing MCVD processing similar to that shown in FIGS. 1 and 2. The region designated as region 41 includes cladding and core sections in sequence from outermost to innermost. The combination, composition, and index profile of the cladding and core sections determines the type of doped fiber to be fabricated. Oxyhydrogen torch 31 heats the substrate 2 by traversing the tube along the direction shown as arrow 44. Accumulating soot 42 and undeposited region 43 are shown for completeness of understanding.

After deposition of the various cladding layers and the core section, a substantially cylindrical opening 47 has been caused to be formed substantially in the center and along the longitudinal axis of the core section. It may be desirable at this point to begin consolidating and collapsing the deposited materials in tube 40 by applying heat from torch 31 along the length of the tube, thereby softening and collapsing the glass materials. If undertaken initially, collapsing should proceed up to such a point where there is sufficient clearance for insertion of the doped filament 45. While the cylindrical opening generally maintains a substantially cylindrical shape after initial collapse, it is contemplated that known vacuum techniques can be applied to cause the opening to deviate to a substantially elliptical shape.

Figure 4:
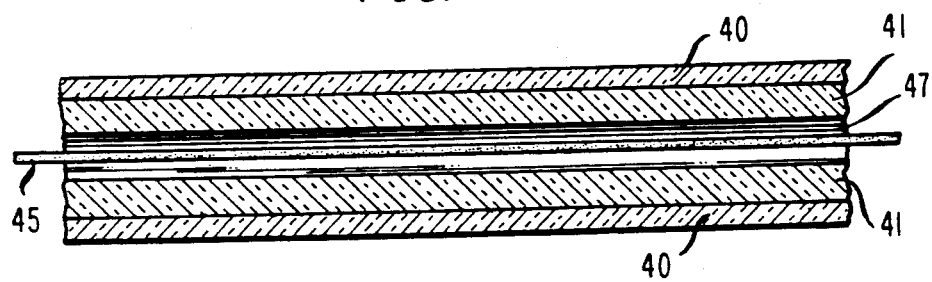
FIG. 4 is a simplified cross-sectional view of the tubular material shown in FIG. 3 after insertion of the doped filament in accordance with the principles of the invention.

In an example from expermental practice, the doped filament is generally fabricated to have an outside diameter of approximately several hundred microns. It is contemplated that the filament have an outside diameter less than or equal to 500 $\mu$m. The doped filament 45 is inserted into the opening formed in the core section either before any initial collapse or after an initial collapse. Insertion commences by pushing the filament into the core opening from the dust collector end of the MCVD reactor. It is expected that the opening has an approximate diameter on the order of 1 mm. In order to facilitate insertion of the doped filament, heat is generally applied by oxyhydrogen torch 31 to the entire substrate tube prior to insertion and/or during insertion. Further, consideration should be given to elimination of contaminants such as OH. With respect to elimination of contaminants, a moving stream of gas mixture including at least one from the group consisting of $O_2$ and $Cl_2$ is provided into the cylindrical opening from the end opposite that which insertion is commenced, that is, opposite the dust collector end. As shown in FIG. 4, insertion occurs from right to left. Hence, the moving stream of gases would be introduced in the opposite direction, that is, from left to right.

After the filament has been placed in the opening of the core section, heat from torch 31 is applied to the tube including the cladding, core section, and filament to consolidate and collapse these elements so that the core section engages the doped filament. Generally, the torch traverses the tube along direction 46. As a result of this processing, a doped optical fiber preform is fabricated. This preform can be drawn using standard techniques to obtain the doped optical fiber.

Doped optical fibers drawn from doped preforms fabricated in accordance with the principles of the invention have the unique properties that highly volatile dopant materials are concentrated substantially along the center axis of the core section of the fiber and the dopant materials are introduced in an amount calibrated to provide a desired concentration in the fiber without requiring chemical reaction between the dopant materials and the deposited core materials. Centering the dopant material in the core is preferred because such a dopant location optimizes pump efficiency. Calibration of the dopant concentration in the filament and ultimately, by scaling, in the doped fiber is accomplished by measuring the loss in the filament prior to insertion to insure predictable and uniform end-to-end dopant concentration in the fiber. Since the loss in a length of filament is known, stretching or further drawing of that filament can be commenced to adjust the loss and, thereby, the dopant concentration to a more desirable level with a greater degree of accuracy. Scaling is understood to refer to the fact that the concentration in the preform (the filament) is to the concentration in the doped fiber as the length of the preform is to the length of the doped fiber drawn therefrom. As a result, doping of fibers in accordance with the principles of the inventive method is accurate and controllable to a much greater degree than prior techniques.

EXAMPLE

Figure 6:
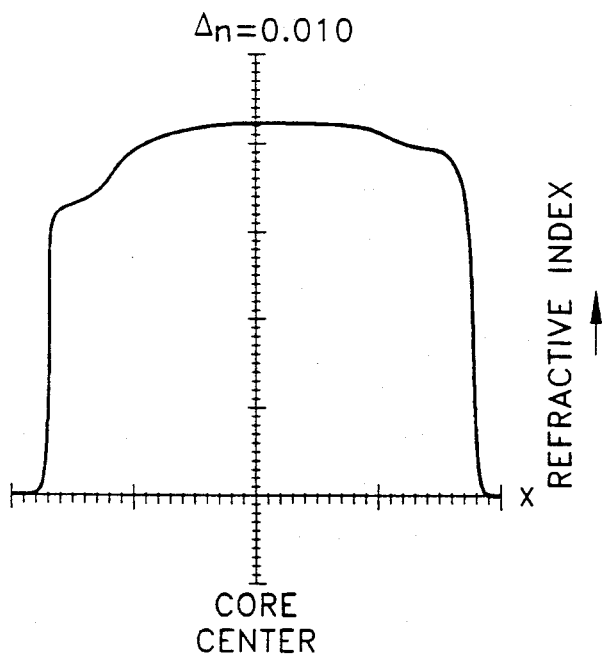
FIG. 6 shows a refractive index profile for an exemplary erbium doped filament.
Figure 7:
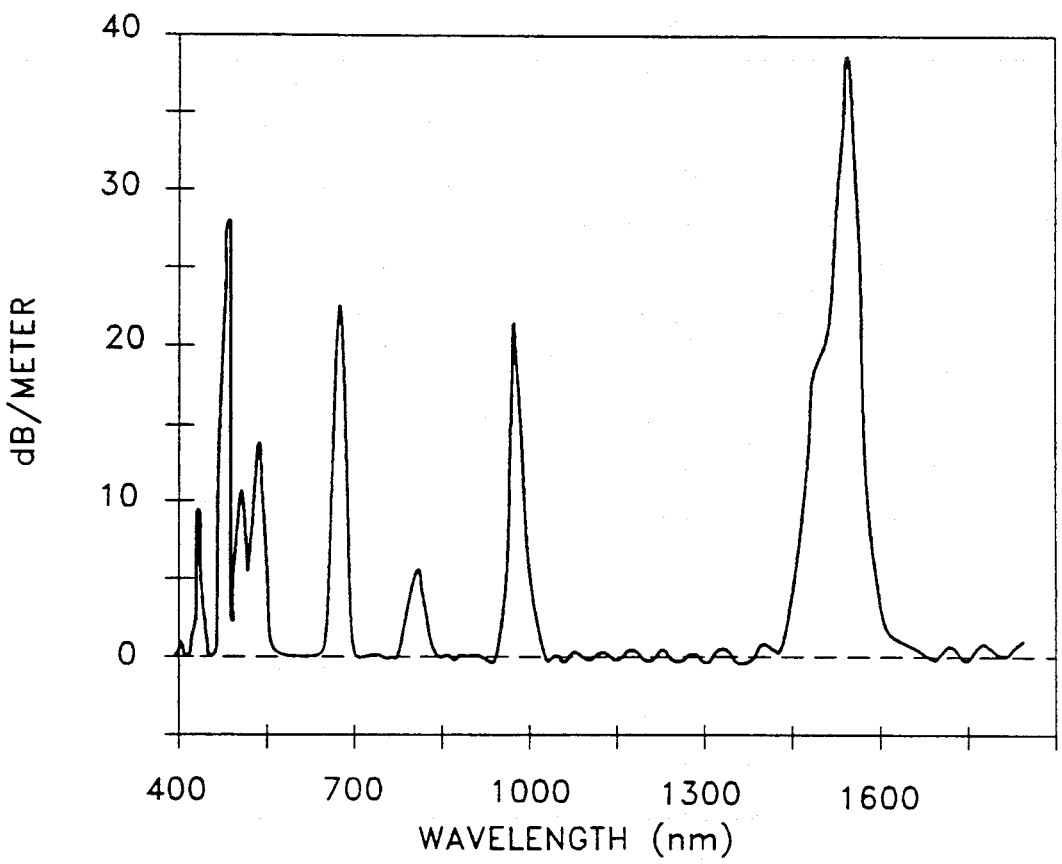
FIG. 7 shows the absorption spectrum for an exemplary erbium doped filament.

In an example from experimental practice, the filament was fabricated by MCVD using a low OH (5 ppm OH by wt.) F300 Amersil support tube having dimensions 19 mm $\times$ 25 mm, inner diameter and outer diameter, respectively. An erbium doped aluminosilicate core was deposited in the support tube using vapor phase dopant delivery to yield a numerical aperture of 0.15 with a mole percent alumina composition of approximately 3.3. A refractive index profile for the core section relative to the support tube (zero baseline) is shown in FIG. 6. After consolidation and collapse of this doped structure to form a preform, the doped filament was drawn using standard techniques known to those skilled in the art. Filaments having two different dimensions were drawn, namely, a filament having a 32 $\mu$m core diameter and a 150 $\mu$m outer diameter and a filament having a 7.4 $\mu$m core diameter and a 100 $\mu$m outer diameter. The spectral loss for such a filament is shown in FIG. 7 wherein a peak absorption of 38 dB/m occurs at 1.53 $\mu$m which indicates an erbium oxide concentration of approximately 1400 ppm.

Figure 8:
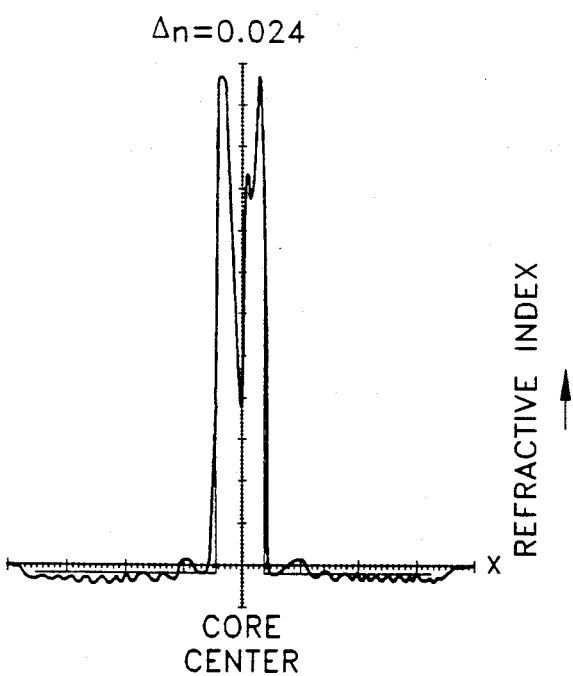
FIG. 8 shows a refractive index profile for an exemplary erbium doped fiber drawn from a preform fabricated in accordance with the principles of the invention.
Figure 9:
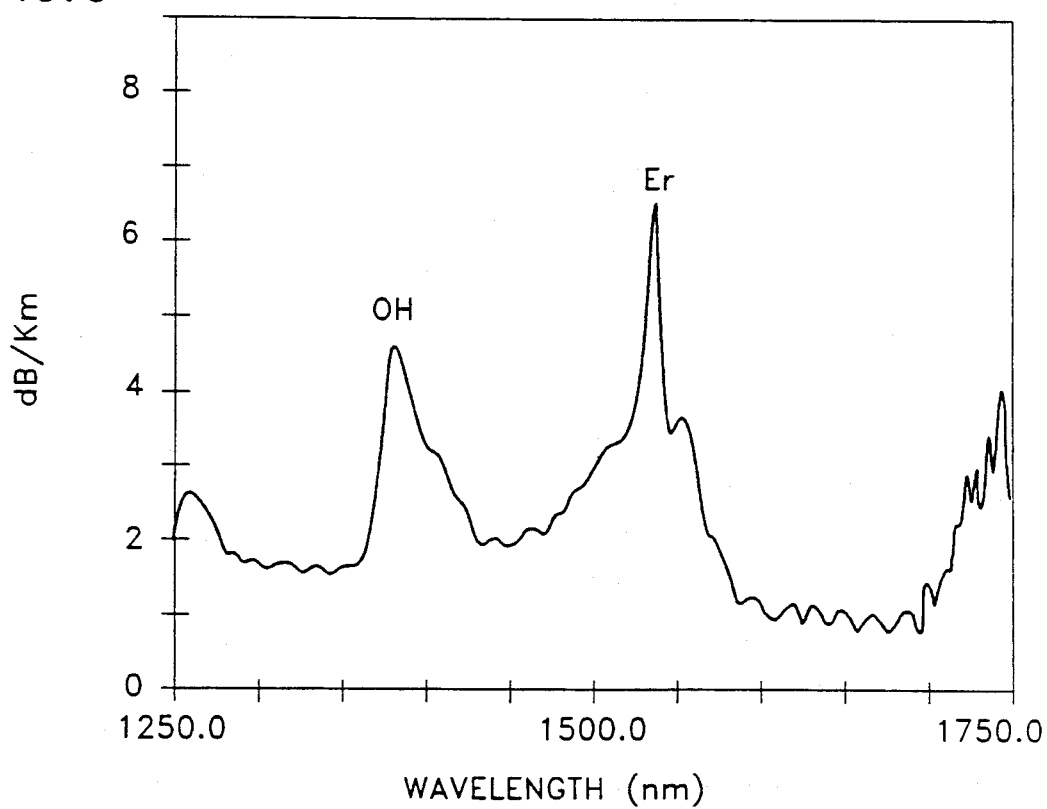
FIG. 9 shows the absorption spectrum for an exemplary erbium doped fiber drawn from a preform fabricated in accordance with the principles of the invention.

In the example from experimental practice, the doped optical fiber preform and the resulting doped optical fiber were fabricated by an MCVD process. A fluorine phosphorus doped cladding layer was first deposited in a standard T08 Amersil 19X25 support tube. Following deposition of the cladding, a germanium silicate core was deposited. The support tube was collapsed so that, after insertion of the filament, only one additional traverse of the torch was necessary to complete fabrication of the preform structure. A refractive index profile for the second exemplary preform is shown in FIG. 8. A corresponding loss or absorption spectrum for the fiber drawn from this preform is shown in FIG. 9. The two large loss peaks shown in FIG. 9 relate to OH and $Er^{3+}$ absorption.

The doped fiber characterized by FIGS. 8 and 9 was drawn to a length of 9.5 km. When bidirectionally pumped using broadband lasers at 1.47 microns, the doped fiber exhibited sufficient loss compensation to achieve transparency.

In the description above, simplified core/cladding structures have been set forth for the filament. It is contemplated that more complex structures can be utilized without affecting the fundamental lightguiding properties of the doped fiber. For example, the filament may be a doped dispersion shifted fiber structure, a doped polarization maintaining fiber structure or the like. In addition, it is contemplated that filaments having protective jackets may also be used. It is expected that insertion of such filaments in an atmosphere of $O_2$ will cause pyrolization of the jacket leaving no appreciable residue behind.

Because of the dimensions and strength of the filament, insertion of the filament through the opening in the core may become difficult. It is contemplated that a rigid member may be bonded or attached to an end of the filament so that it can be inserted in the opening and be used to pull the filament through the core.

As described above, the present process of forming a doped preform does not require chemical reaction of the dopant material with the deposited core material. In effect, the dopant materials are locked into the filament and are thereby stabilized. As opposed to standard rod and tube techniques, the present process does not require volatilization of the dopant materials. The present process permits incorporation of common dopant materials as well as dopant material which could not otherwise be deposited by standard vapor phase delivery or liquid phase delivery techniques.

We claim:

1. Process for fabrication of a glass fiber optical transmission line, the process comprising the steps of providing a preform workpiece having a cylindrical opening extending from a first end of said preform workpiece to a second end of the preform workpiece, inserting a filament having a central longitudinal axis into said cylindrical opening at said first end at least until the filament emerges from said second end the filament comprising a core region and a cladding region surrounding the core region wherein the core and cladding regions have different refractive indicies, said filament including a predetermined concentration of dopant material within the core region of the filament heating the preform workpiece to collapse around and engage the filament thereby producing a solid optical fiber preform, and drawing the solid optical fiber preform to produce a doped glass fiber optical transmission line, the dopant material concentrated substantially along the central longitudinal axis of the filament, the filament having an outside diameter less than or equal to 250 um.

2. The process as defined in claim 1 wherein the preform workpiece and filament comprise glass materials selected from the group consisting of silicon-bearing compounds.

3. The process as defined in claim 2 wherein the dopant materials are selected from the group consisting of rare earth ions such as $Nd^{3+}$, $Ho^{3+}$, $Eu^{3+}$, $Er^{3+}$, $Yb^{3+}$, $Tb^{3+}$, and $Dy^{3+}$.

4. The process as defined in claim 1 including heating the preform workpiece to a predetermined temperature below a melting point prior to insertion of the filament to facilitate insertion.

5. The process as defined in claim 1 including rotating the preform workpiece axially during the heating step.

6. The process defined in claim 1 including providing a moving stream of gas mixture including at least one from the group consisting of $O_2$ and $Cl_2$ in said cylindrical opening from the second end toward the first end during insertion of the filament.

7. The process defined in claim 1 wherein heating is produced by a moving heat source external to the preform workpiece.

* * * * *

UNITED STATES PATENT AND TRADEMARK OFFICE
CERTIFICATE OF CORRECTION

PATENT NO. : 5,059,230

DATED : October 22, 1991

Page 1 of 2

INVENTOR(S) : Linn F. Mollenauer, Jay R. Simpson, Kenneth L. Walker

It is certified that error appears in the above-identified patent and that said Letters Patent is hereby corrected as shown below:

Columns 5 and 6, should be inserted as per the attached page.

Signed and Sealed this

Thirtieth Day of November, 1993

Attest:

BRUCE LEHMAN

Attesting Officer

Commissioner of Patents and Trademarks cally depicted by double headed arrow 5b, for example, by a threaded feed member 6. A gaseous material is introduced into tube 2 via inlet tube 7 which is, in turn, connected to source material reservoirs 8. Such reservoirs may include an oxygen inlet 9 connected to means not shown. As depicted, gaseous material may also be introduced by inlets 10 and 11 by means not shown and through inlet 12 from reservoir 13. Reservoirs 14 and 15 contain normally liquid reactant material which is introduced into tube 2 by means of carrier gas introduced through inlets 10 and 11 with the arrangement being such that the carrier gas is bubbled through such liquids 16 and 17. Exiting material is exhausted through outlet 18. Not shown is the arrangement of mixing valves and shut off valves which may be utilized to meter flows and to make other necessary adjustments in composition. The apparatus of FIG. 1 is generally horizontally disposed.

The apparatus of FIG. 1 can be disposed vertically with only minor modifications while maintaining its operational characteristic quite similar to the apparatus of FIG. 1. Vertical disposition of the substrate tube, however, lends stability to the portion of the tube within the hot zone and may permit attainment of higher temperature or of longer hot zones in the traversal direction without objectionable distortion.

FIG. 2 is a front elevational view of a section of a substrate tube 30 as observed during deposition. Depicted is a heating means 31 producing a hot zone 32 which is traversing tube 30 in the direction shown by arrow 33 by means not shown. Gaseous material is introduced at the left end of tube 30 and flows in the broken section of the figure in the direction shown by arrow 34. For the processing condition, two regions are clearly observable. Zone 35 downstream of hot zone 32 is filled with a moving powdery suspension of particular oxidic material, while region 36, devoid of such particulate matter, defines the region within which fusion of deposited material is occuring.

Consolidation of the deposited materials is required to make the preform structure. Tube 30 is heated to a high temperature by moving the oxyhydrogen torch 31 slowly along the length of the tube. As the torch traverses the tube, the temperature of the glass reaches its softening point. When the softening point is reached, the surface tension causes the tube with it's deposited glass layers to collapse uniformly into a solid rod called a preform.

The final step in the optical fiber fabrication process is drawing the fiber from the preform. Fiber drawing is accomplished by inserting the preform structure into a high temperature furnace by means of a preform feed mechanism. Alignment and centering of the preform relative to the furnace is critical. This can be accomplished by manual or automated alignment techniques well known to those skilled in the art. For silica fiber drawing, considerations with respect to glass viscosity require draw temperatures in the range of 1900° to 2300° C. The tip of the preform softens as it is fed into the high temperature furnace. Both gravity and an applied tensile force causes the glass to "neck down" to a small diameter fiber. The shape of the neck down region is determined by a variety of factors including the thermal gradient in the furnace and applied draw forces. A control tensile force is sustained by using a fiber pulling capstan or some other source of tension. The preform feed rate and capstan rotation rate determine the drawdown ratio from preform to fiber. Typically, preforms ranging from 10 to 70 mm are drawn down to fiber in the 100 to 225 μm range. Fiber diameter control is most commonly achieved by varying the draw speed while feeding preforms at a fixed rate through a constant temperature heat source. In-line processes are known to those skilled in the art for applying protective coatings to the glass fiber as it is being drawn.

A more detailed explanation of modified chemical vapor deposition is given in U.S. Pat. No. 4,217,027 and its related Reexamination Certificate B1 4,217,027, both of which are expressly incorporated herein by reference. Also with respect to other standard deposition techniques, detailed explanations of vapor axial deposition and outside vapor deposition are given in U.S. Pat. Nos. 3,966,446 (VAD); 3,737,292 (OVD); and 3,737,293 (OVD), all of which are expressly incorporated herein by reference.

FIBER DOPING

As described above, the doped filament is fabricated by standard optical fiber fabrication processes which include a standard process for introduction of dopant material for its incorporation in the preform which is ultimately drawn to form the filament. Methods have been devised for a dopant delivery to the reaction and deposition zones during preform fabrication using MCVD and VAD or OVD techniques. These methods comprise both vapor phase delivery and liquid phase delivery methods.

For vapor phase delivery of dopant material in MCVD processing, heated sponge, heated source and heated source injector deliver dopant materials such as rare earth chloride vapor for reaction downstream by oxidation along with other standard reactors. In all of these methods, the low pressure reactant is accommodated by bringing the vapor source close to the reaction zone and immediately diluting the source by mixing with other reactants. The heated sponge source is made by soaking a porous soot region deposited on the upstream inner wall of an MCVD tube using a rare earth chloride solution. Upon heating and after dehydration, the sponge becomes a source for rare earth dopants. Both other methods use heated chloride directly as a source after dehydration.

An additional vapor phase dopant delivery method in MCVD processing is the aerosol delivery method. This method overcomes the need for heated source compounds in that the vapor is generated at the reaction site. While aerosol delivery provides a means for incorporating a variety of dopants, it requires consideration for the reaction or elimination of carrier liquid products such as OH.

Similar techniques for vapor phase dopant delivery have been devised for OVD and VAD. A more detailed explanation of vapor phase delivery of dopant materials in an MCVD process is provided in U.S. Pat. Nos. 4,616,901 and 4,787,927 which are expressly incorporated herein by reference.

Liquid phase methods have also been devised for use in MCVD processing. These methods include soot impregnation, molecular stuffing and solution doping. In the latter method, an unsintered or porous layer of silica is first deposited inside the tube by the MCVD process. Doping occurs by filling the tube with an aqueous solution of a rare earth chloride. The solution is allowed to soak into the unsintered layer for approximately one hour prior to draining. The impregnated layer is then dried at high temperatures in the presence of a flowing